US009643555B2

(12) United States Patent
Rahe et al.

(10) Patent No.: US 9,643,555 B2
(45) Date of Patent: May 9, 2017

(54) BUMPER ASSEMBLY FOR A PASSENGER CAR AND PASSENGER CAR HAVING SUCH A BUMPER ASSEMBLY

(71) Applicant: Bayerische Motoren Werke Aktiengesellschaft, Munich (DE)

(72) Inventors: Christian Rahe, Munich (DE); Tobias Riedl, Munich (DE); Gerhard Fichtinger, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/865,545

(22) Filed: Sep. 25, 2015

(65) Prior Publication Data

US 2016/0009237 A1    Jan. 14, 2016

Related U.S. Application Data

(63) Continuation of application No. PCT/EP2014/055833, filed on Mar. 24, 2014.

(30) Foreign Application Priority Data

Mar. 27, 2013   (DE) .................. 10 2013 205 490

(51) Int. Cl.
| | |
|---|---|
| *B60R 19/48* | (2006.01) |
| *B60R 19/12* | (2006.01) |
| *B60R 21/0136* | (2006.01) |
| *B60R 19/44* | (2006.01) |

(52) U.S. Cl.
CPC ............ *B60R 19/483* (2013.01); *B60R 19/12* (2013.01); *B60R 19/44* (2013.01); *B60R 21/0136* (2013.01)

(58) Field of Classification Search
CPC .......................... B60R 19/483; B60R 21/0136
USPC ........................ 296/187.04; 293/4, 107, 102
See application file for complete search history.

(56) References Cited

U.S. PATENT DOCUMENTS

| | | | |
|---|---|---|---|
| 6,561,301 B1 | 5/2003 | Hattori et al. | |
| 7,804,414 B2 | 9/2010 | Kiribayashi | |
| 8,942,891 B2 | 1/2015 | Watanabe et al. | |
| 2007/0046044 A1* | 3/2007 | Tanabe ................ | B60R 21/0136 293/120 |
| 2007/0182172 A1* | 8/2007 | Hasegawa ............... | B60R 19/18 293/102 |

(Continued)

FOREIGN PATENT DOCUMENTS

| | | |
|---|---|---|
| DE | 10 2008 021 611 A1 | 1/2009 |
| DE | 10 2008 024 121 A1 | 11/2009 |

(Continued)

OTHER PUBLICATIONS

PCT/EP2014/055833, International Search Report dated May 16, 2014 (Two (2) pages).

(Continued)

*Primary Examiner* — Jason S Morrow
(74) *Attorney, Agent, or Firm* — Crowell & Moring LLP

(57) ABSTRACT

The disclosure relates to a bumper assembly for a passenger car having a bumper cover for covering a flexible cross-member and at least one stiffening element for stiffing the bumper cover at least below the flexible cross-member. At least one sensor is coupled to the stiffening element to detect deformation of the stiffening element resulting from a collision of the passenger car with a pedestrian.

16 Claims, 2 Drawing Sheets

(56) References Cited

U.S. PATENT DOCUMENTS

| | | | |
|---|---|---|---|
| 2008/0204210 A1* | 8/2008 | Tanabe | B60R 21/0136 296/187.04 |
| 2009/0015390 A1* | 1/2009 | Kiribayashi | B60R 21/0136 340/436 |
| 2009/0021029 A1* | 1/2009 | Kiribayashi | B60R 21/0136 293/117 |
| 2011/0127798 A1 | 6/2011 | Lee | |
| 2014/0052341 A1* | 2/2014 | Leach | B60R 21/0136 701/45 |
| 2015/0291122 A1* | 10/2015 | Seo | B60R 21/0136 701/45 |

FOREIGN PATENT DOCUMENTS

| | | |
|---|---|---|
| DE | 10 2010 000 223 A1 | 10/2010 |
| DE | 10 2011 054 754 A1 | 5/2012 |
| DE | 11 2010 005 436 T5 | 4/2013 |
| WO | WO 2005/110816 A1 | 11/2005 |

OTHER PUBLICATIONS

German Search Report issued in counterpart German Application No. DE 10 2013 205 490.4 dated Nov. 26, 2013, with Statement of Relevancy (Six (6) pages).

\* cited by examiner

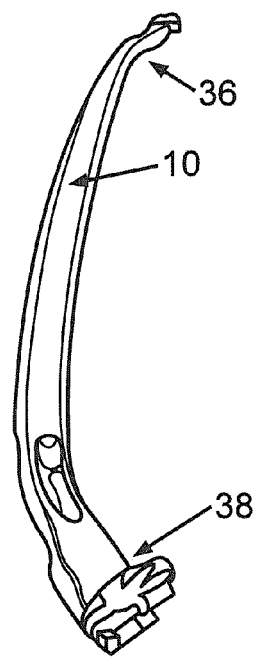
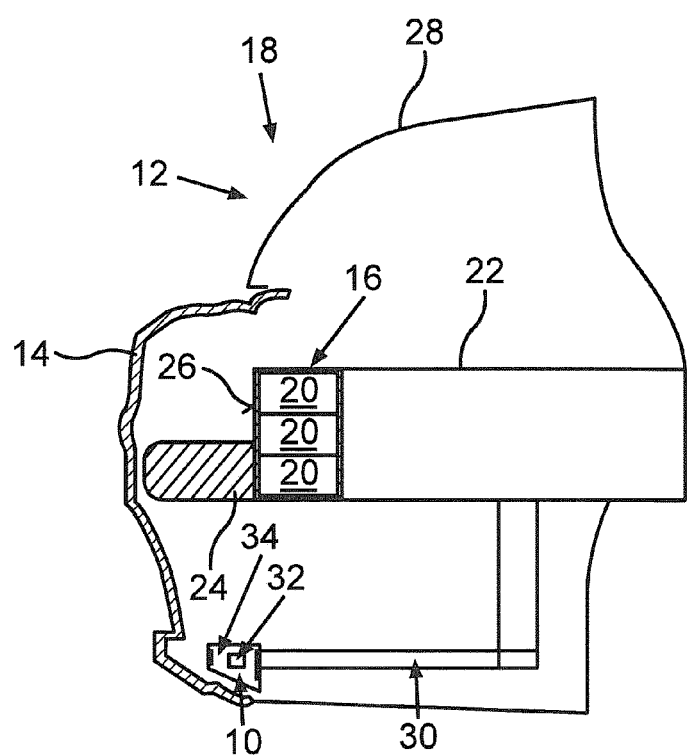

BUMPER ASSEMBLY FOR A PASSENGER CAR AND PASSENGER CAR HAVING SUCH A BUMPER ASSEMBLY

CROSS REFERENCE TO RELATED APPLICATIONS

This application is a continuation of PCT International Application No. PCT/EP2014/055833, filed Mar. 24, 2014, which claims priority under 35 U.S.C. §119 from German Patent Application No. 10 2013 205 490.4, filed Mar. 27, 2013, the entire disclosures of which are herein expressly incorporated by reference.

BACKGROUND AND SUMMARY OF THE INVENTION

The invention relates to a bumper assembly for a passenger car and to a passenger car having such a bumper assembly.

Such bumper assemblies for passenger cars are known sufficiently from the series production of vehicles. The bumper assembly comprises a bumper cover by means of which a flexible cross member extending in the transverse direction of the vehicle is covered. For this purpose, the bumper cover is arranged in front of the flexible cross member in the longitudinal direction of the vehicle, wherein the flexible cross member is covered to the front by the bumper cover in the longitudinal direction of the vehicle.

The bumper assembly also comprises at least one reinforcement element for reinforcing the bumper cover at least underneath the flexible cross member. For this purpose, the reinforcement element is arranged underneath the flexible cross member at least partially in the longitudinal direction of the vehicle.

The reinforcement element is usually also referred to as a "lower stiffener", as a "lower bumper stiffener" or else also as a "lower load path". The reinforcement element serves to reinforce the bumper cover, in particular in the case of force application owing to an accident. If, for example, the lower leg of a pedestrian, which can be simulated by a leg impacter, impacts against the bumper cover, the reinforcement element ("lower stiffener") which is arranged underneath the flexible cross member ensures that the pedestrian is accelerated with a corresponding force in the region of his lower legs and therefore is moved in a defined fashion onto a front hood. Such a "lower stiffener" can be found to be disclosed in, for example, US 2011/0127798 A1.

Furthermore, it is known from the series production of vehicles to use sensors to sense collisions of the passenger car with pedestrians. Such a sensor can reliably detect collisions with pedestrians and supply necessary information to safety devices of the passenger car in order to trigger, as a result of the collision, protection measures for protecting the pedestrian. For this purpose, it may be provided, for example, that within 10 to 15 ms after the collision the front hood, which is embodied, for example, as an active engine hood, is correspondingly actuated and raised by actuators. In this context, the front hood is moved upward in the vertical direction of the vehicle and, for example, forward in the longitudinal direction of the vehicle in order to increase the distance between the front hood and an engine block which is arranged underneath it in the vertical direction of the vehicle. As a result, valuable protection space can be provided at least to reduce the consequences of the accident.

Usually, in order to sense such a collision with a pedestrian, a hose which extends in the transverse direction of the vehicle is used, by means of which hose the flexible cross member is covered to the front at least in certain areas in the longitudinal direction of the vehicle. Owing to a collision of the passenger car with a pedestrian, the hose is deformed, which results in turn in a change in pressure in the hose. This change in pressure can be sensed by means of at least one sensor, with the result that the collision with the pedestrian can ultimately be sensed.

Such collision sensing devices are known, for example, from DE 10 2008 021 611 A1 and DE 10 2010 000 223 A1.

The use of the hose leads, however, to a large number of parts and therefore to a high weight and to a large installation space requirement in the passenger car, in particular in the front region thereof.

The present invention therefore has, as one object, making available a bumper assembly of the type mentioned at the beginning and a passenger car having such a bumper assembly, by means of both of which a collision of the passenger car with a pedestrian can be sensed in a manner which is, in particular, favorable in terms of weight and installation space.

This object is achieved by a bumper assembly having the features of the independent claims. Advantageous embodiments with expedient and non-trivial developments of the invention are specified in the other claims.

Such a bumper assembly for a passenger car comprises a bumper cover for covering a flexible cross member and at least one reinforcement element for reinforcing the bumper cover at least underneath the flexible cross member. As described in the introduction, such a reinforcement element is usually also referred to as a "lower stiffener", as a "lower bumper stiffener" or else also as a "lower load path".

In order then to be able to sense any collision of the passenger car with a pedestrian in a way which is, in particular, favorable in terms of installation space and weight, at least one sensor, which is coupled to the reinforcement element, is provided for sensing a deformation of the reinforcement element which results from a collision of the car with a pedestrian. This means that the reinforcement element which is present in any case is used to sense a collision of the passenger car with a pedestrian. An additional component, for example a hose, is therefore not provided, and not necessary, for sensing a collision of the passenger car with a pedestrian.

In the bumper assembly according to the invention, the reinforcement element and its function described at the beginning, to accelerate the pedestrian in the region of his lower legs and as a result to convey said pedestrian in a defined fashion onto a front hood of the passenger car, are used in order also to sense the collision itself. The invention is based here on the idea that in the case of a collision of the passenger car, and in particular of the bumper assembly, with the pedestrian, an application of force owing to the accident and a resulting deformation of the reinforcement element occur in any case, and this can then be used by means of the at least one sensor to sense the collision.

The reinforcement element is therefore assigned a double function. On the one hand, it serves to convey the pedestrian onto the front hood in a targeted fashion, with the result that said passenger does not move under the passenger car but instead can roll in a targeted fashion on the front hood and can therefore be protected. On the other hand, the reinforcement element is used to sense the collision itself owing to the application of force to the reinforcement element resulting from the collision with the pedestrian.

Owing to the sensing of the collision, at least one protective measure can be initiated to protect the pedestrian further in the further course of the collision. In the scope of this at least one protective measure, for example at least one actuator element of the front hood is actuated in order to move the front hood up, i.e. to extend it, at least in the vertical direction of the vehicle by means of the actuator element. As described at the beginning, it is therefore possible to enlarge a distance from the front hood to a drive assembly of the passenger car which is arranged underneath the front hood in the vertical direction of the vehicle, in order thereby to provide additional protection space for the pedestrian.

In one particularly advantageous refinement of the invention, the reinforcement element has at least one chamber filled with a gas, in particular air, which chamber can be deformed as a result of the collision with the pedestrian, and to which the at least one sensor is coupled. In this case, the sensor is configured to sense a change in pressure in the chamber resulting from the deformation of the chamber. In other words, a change in pressure in the chamber results from the deformation thereof, wherein this change in pressure can be sensed by means of the sensor. In this way, the collision with the pedestrian can be inferred in a particularly simple way which is favorable in terms of weight and with only a very small number of parts.

It proves particularly advantageous if the at least one sensor is coupled to the chamber at a first end thereof, wherein at least one second sensor, by means of which a change in pressure in the chamber resulting from the deformation of the chamber can be sensed, is coupled to the chamber at a second end thereof, spaced apart from the first end in the transverse direction of the vehicle. As a result of the use of the at least two sensors which are spaced apart from one another in the transverse direction of the vehicle, not only the collision with the pedestrian per se can be sensed. In addition it is possible also to sense a location or a region of the reinforcement element, and therefore of the bumper assembly, at which or in which the collision with the pedestrian has taken place. Therefore, a position of an impact region in which the pedestrian impacts against the bumper assembly can be determined relative to the bumper assembly as a whole or with respect to the passenger car, with the result that the at least one protective measure can be carried out as a function of the determined position.

As a result it is possible, for example, to adapt the process of extending the front hood to the position of the impact region. The front hood can therefore, for example, be moved into different positions by means of at least one actuator element depending on the position determined for the impact region. As a result, particularly good protection of the pedestrian can be made available.

In a particularly advantageous embodiment of the invention, the reinforcement element, in particular the chamber, extends over an at least major part of the width of the passenger car extending in the transverse direction of the vehicle. As a result, such a collision of the passenger car with a pedestrian can also be sensed in a way which is favorable in terms of weight, cost and installation space, such a collision taking place in the edge regions or corner regions of the passenger car. As a result, the pedestrian can be particularly effectively protected.

In a further advantageous refinement of the invention, the reinforcement element is supported on a carrier element, in particular a longitudinal carrier, of the passenger car. As a result, the bumper cover can be reinforced particularly well by means of the reinforcement element, since the reinforcement element itself is supported on the carrier element in a particularly stable and fixed fashion. As a result, the pedestrian can be accelerated very well in the region of his lower legs and advantageously conveyed onto the front hood. Furthermore, this support benefits the sensing of the collision since a deformation of the reinforcement element and resulting sensing of the collision can occur particularly early during the collision.

In order to implement support of the reinforcement element in a way which is particularly fixed and favorable in terms of installation space, there is provision that the flexible cross member is also supported on the carrier element, in particular the longitudinal carrier. As a result, the expenditure for supporting the reinforcement element can be kept particularly low.

Particularly advantageous reinforcement of the bumper cover can be implemented if the reinforcement element is secured to the carrier element independently of the bumper cover. This means that, for example, the bumper cover can be removed, that is to say detached from the passenger car, without as a result the attachment of the reinforcement element to the carrier element being adversely affected, and vice versa. In other words, the bumper cover can be removed without the reinforcement element having to be removed as well.

In this context there is preferably provision that the reinforcement element is not attached to the bumper cover.

In a further embodiment, the reinforcement element is embodied in an inherently rigid fashion, that is to say is dimensionally stable. The reinforcement element is preferably not elastically deformable here such as, for example, a foam. In addition, there is preferably provision that the reinforcement element is formed from a material which is different from a foam.

A further embodiment is defined by the fact that the reinforcement element is, in particular, completely spaced apart from the bumper cover in the longitudinal direction of the vehicle. The reinforcement element is preferably, in particular, completely, spaced apart from the bumper cover rearward in the longitudinal direction of the vehicle. The term "completely spaced apart" is to be understood as meaning that the reinforcement element is not in contact with the bumper cover in an undeformed state, that is to say not at any point.

In addition it is possible to provide that the reinforcement element is embodied as a component which is embodied separately from the bumper cover. In other words, the bumper cover and the reinforcement element are, for example, two separate components which can be secured, that is to say mounted, separately, that is to say independently of one another, on the passenger car. This means that the reinforcement element and the bumper cover are each independently secured to the passenger car without the bumper cover being necessary to secure the reinforcement element to the passenger car or the reinforcement element being necessary to secure the bumper cover to the passenger car.

The invention also includes a passenger car having a bumper assembly according to the invention. Advantageous refinements of the bumper assembly according to the invention are to be considered as advantageous refinements of the passenger car according to the invention, and vice versa. Owing to the use of the reinforcement element both to accelerate the pedestrian in the region of his lower legs and to sense the collision itself, a particularly advantageous accident behavior of the passenger car can be implemented in a way which is favorable in terms of cost, weight and installation space, since additional sensors such as, for example, a pressure hose are not provided and are not necessary for sensing the pedestrian collision.

Further advantages, features and details of the invention can be found in the following description of a preferred exemplary embodiment and with reference to the drawing. The features and combinations of features which are specified in the description above and the features and combinations of features which are specified below in the description of the figures and/or those which are only shown in the figures can be used not only in the respective specified combination but also in other combinations or alone without departing from the scope of the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a schematic and perspective plan view of a reinforcement element for reinforcing a bumper cover at least underneath a flexible cross-member of a passenger car;

FIG. 2 shows a schematic cross-sectional view of a bumper assembly for the passenger car, which bumper assembly comprises the bumper cover and the reinforcement element, wherein sensors which are coupled to the reinforcement element are provided for sensing a deformation of the reinforcement element which results from a collision of the passenger car with a pedestrian.

DETAILED DESCRIPTION OF THE DRAWINGS

Figure 3:
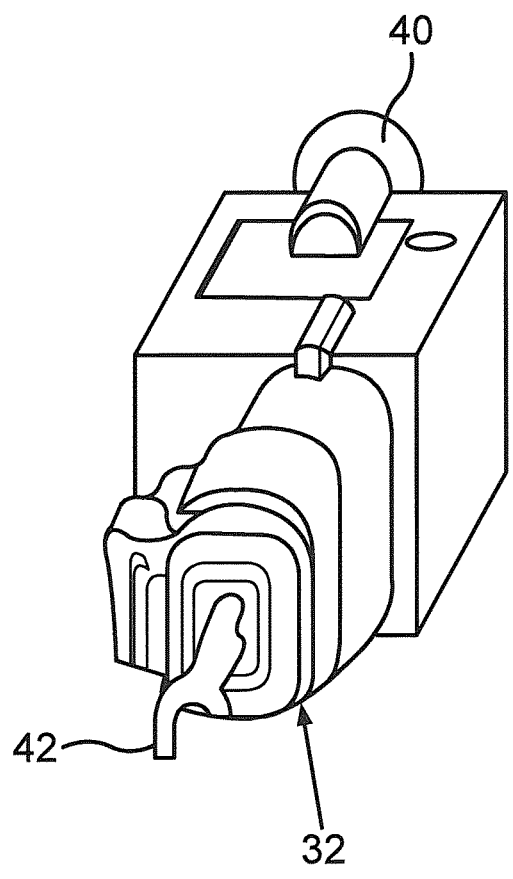
FIG. 3 shows a schematic and perspective view of one of the sensors which is coupled to a chamber of the reinforcement element at one end of said chamber.

FIG. 1 shows a schematic and perspective plan view of a reinforcement element 10 for a bumper assembly 12, shown in FIG. 2, for a passenger car. As is apparent from FIG. 2, the bumper assembly 12 comprises a bumper cover 14 which is formed, for example, from plastic and by means of which a flexible cross-member 16 of the passenger car is covered toward the front in the longitudinal direction of the vehicle (x direction). The bumper assembly 12 is therefore a front bumper assembly or a bumper assembly which is arranged on a front part 18 of the passenger car.

The flexible cross-member 16 is embodied here as a profiled component and has three closed hollow chambers 20. In addition, the flexible cross-member 16 extends in the transverse direction of the vehicle (y direction) and is supported on two longitudinal carriers which are spaced apart from one another in the transverse direction of the vehicle, a longitudinal carrier 22 of which can be seen in FIG. 2.

The flexible cross-member 16 serves, in particular, to absorb forces caused by an accident in the event of a head-on impact of the passenger car against an obstacle, to distribute said forces in the transverse direction of the vehicle and to distribute them between the longitudinal carriers. The flexible cross-member 16 can be supported here on the longitudinal carriers via respective energy-absorption elements, which are also referred to as crash boxes. Owing to the application of force as a result of the accident, the crash boxes are deformed and, if appropriate, the longitudinal carriers, with the result that accident energy is converted into deformation energy.

An absorption element in the form of a foamed element 24 is arranged in the longitudinal direction of the vehicle in front of the flexible cross-member 16. In this context, the flexible cross-member 16 is covered toward the front, in the longitudinal direction of the vehicle, at least partially by the foamed element 24 which extends in the transverse direction of the vehicle. The foamed element 24 is arranged here on a front side 26 of the flexible cross-member 16. As is also apparent from FIG. 2, the foamed element 24 is arranged in the longitudinal direction of the vehicle between the flexible cross-member 16 and the bumper cover 14.

If, for example, a collision of the passenger car occurs with a pedestrian via the bumper assembly 12, at least one region of the bumper cover 14 is moved rearward toward the bumper 16 in the longitudinal direction of the vehicle owing to the accident. As a result of this movement owing to the accident, the foamed element 24 is compressed and therefore deformed, with the result that it can convert impact energy into deformation energy and can dampen the impact of the pedestrian against the bumper cover 14.

FIG. 2 also shows a front hood 28 (illustrated schematically) of the passenger car, wherein the front hood 28 is embodied as an engine hood and serves to cover an engine compartment upward in the vertical direction of the vehicle. At least one drive assembly, for example in the form of an internal combustion engine of the passenger car, is arranged in the engine compartment.

As is apparent from FIG. 2, the reinforcement element 10 is arranged underneath the flexible cross-member 16 in the vertical direction of the vehicle, wherein it can cover the flexible cross-member 16 toward the bottom in the vertical direction of the vehicle, at least in certain areas. The reinforcement element 10 is, however, arranged here without overlap with respect to the flexible cross-member 16 and in front of the flexible cross-member 16 in the longitudinal direction of the vehicle. The reinforcement element 10 preferably extends at least over a major part of the width of the passenger car in the transverse direction of the vehicle and is supported on the longitudinal carriers via strut elements 30.

The foamed element 24 is covered here in the vertical direction of the vehicle toward the bottom partially by the reinforcement element 10, wherein the reinforcement element 10 is set back a certain amount toward the rear in the longitudinal direction of the vehicle with respect to the foamed element 24.

The reinforcement element 10 is also referred to as a "lower stiffener" or as a "lower force path" and serves to reinforce the bumper cover 14 underneath the flexible cross-member 16. The reinforcement element 10 serves, in particular, to reinforce the bumper cover 14 in the event of application of force owing to an accident, which occurs when there is a collision between the bumper assembly 12 and the pedestrian.

In the case of such a pedestrian collision, for example a lower leg of the pedestrian impacts against the bumper cover 14, wherein the lower leg is supported on the reinforcement element 10 via the bumper cover 14. In this context, the lower leg can form, via the reinforcement element 10, a load path to the longitudinal carriers, with the result that the reinforcement element 10 ensures that the pedestrian accelerates with a corresponding force in the region of his lower legs and therefore is moved onto the front hood 28 in a defined fashion. The pedestrian can therefore be conveyed in a selective and defined fashion onto the front hood 28 in the course of the collision and can roll over said front hood 28, with the result that said pedestrian does not move under the passenger car.

In order to implement a particularly advantageous accident behavior of the passenger car there is provision for such a collision of the passenger car with the pedestrian to be sensed. Owing to this sensing, at least one protective measure can be triggered in order to protect the pedestrian particularly advantageously against the consequences of the accident. Within the scope of this at least one protective measure, it is provided, for example, to extend the front hood 28 upward in the vertical direction of the vehicle and, if appropriate, forward in the longitudinal direction of the vehicle, i.e. to raise said front hood 28, by means of at least one actuator element. As a result, a distance between the front hood 28 and the drive assembly can be enlarged with respect to a position of the front hood 28 before it was extended, in order therefore to protect the pedestrian against an impact against the drive assembly and to provide a protective space for intercepting the pedestrian.

In order to sense the collision of the passenger car with a pedestrian, two sensors which are coupled to the reinforcement element 10 are now provided, it being possible to sense by means of said sensors a deformation of the reinforcement element 10 which results from a collision of the passenger car with a pedestrian. In this context, a sensor 32 of said sensors can be seen in FIGS. 2 and 3 here, wherein FIG. 3 shows the sensor 32 in a schematic perspective view.

As is apparent from FIG. 2, the reinforcement element 10 has a continuous chamber 34 which extends in the transverse direction of the vehicle. The chamber 34 is formed here by a closed hollow cross section of the reinforcement element 10 which is embodied as a closed profile, and is filled with a gas, in particular air.

The sensors are arranged spaced apart from one another in the transverse direction of the vehicle, wherein the sensor 32 is coupled to the chamber 34 at a first end 36 (FIG. 1) thereof. The other sensor is coupled here to the chamber 34 at a second end 38, spaced apart from the first end 36 in the transverse direction of the vehicle, of said chamber 34. The term coupling of the sensors is to be understood here as meaning, for example, that a respective measuring space of the sensors is coupled fluidically to the chamber 34, with the result that, for example, a respective measuring element of the sensors is in contact with, or supplied with, the gas which is accommodated in the chamber 34 and therefore in the respective measuring space.

If there is now a collision of the passenger car with a pedestrian, as a result of which the pedestrian impacts against the bumper cover 14 with the result that the bumper cover 14 is moved back toward the rear in the longitudinal direction of the vehicle and the pedestrian is supported on the reinforcement element 10 via the bumper cover 14, this can result in a deformation of the reinforcement element 10 and therefore of the chamber 34. This results in turn in an at least temporary change in pressure and, in particular, in an at least temporary increase in pressure in the chamber 34, wherein this change in pressure, in particular the increase in pressure, can be sensed by means of at least one of the sensors. The at least one sensor which senses the change in pressure and senses the collision with the pedestrian by means of said change makes available at least one collision signal which characterizes the change in pressure and therefore the collision, said collision signal being transmitted, for example, to a computing device of a control unit of the passenger car. For example, an information network can calculate in a very short time which type of collision it is by means of corresponding accident algorithms of evaluation software which can be executed by the computing device, and by means of information about the vehicle speed of the passenger car from said information network.

As a result of the spacing apart of the sensors from one another and by means of a comparison of respective collision signals which characterize the change in pressure in the chamber 34, conclusions can also be drawn, by means of signal propagation times, about the location or the region at which or in which the pedestrian has impacted against the bumper assembly 12. As a result it is possible, for example, to determine whether the impact has taken place front right in the forward direction of travel or in the region of the center of the vehicle.

As a result, the at least one protective measure, which can have its optimum effect in particular in the case of a city center accident with initial speeds of 55 km/h and a collision speed in the range between 20 km/h and 30 km/h, can be activated in good time by the control unit. In other words it is possible to extend the front hood 28 in a particularly short time after the actual impact has occurred, and therefore to intercept the pedestrian.

What is described above and below with respect to the sensor 32 can also easily be transferred to the other sensor. As is apparent from FIG. 3, the sensor 32 is fluidically connected to the chamber 34 via, for example, at least one coupling element 40. Via a signal line 42, which can be seen in FIG. 3, the sensor 32 is electrically connected to the control unit, with the result that the collision signal can be transmitted to the control unit via the signal line 42.

In the case of the bumper assembly 12, the reinforcement element 10 is assigned a double function. On the one hand, the reinforcement element 10 is used to accelerate the pedestrian in the region of his lower legs and therefore to convey the pedestrian in a defined way onto the front hood 28. On the other hand, the reinforcement element 10 is used to sense the collision itself via the deformation of said reinforcement element 10 and the associated change in pressure in the chamber 34.

In this context, there is, for example, provision for the sensors which are embodied as compressed air sensors to be integrated into the reinforcement element 10, wherein the sensors can be accommodated at least partially, in particular at least mainly and preferably completely, in the reinforcement element 10.

An additional sensor element, which surrounds a volume, for sensing the collision is therefore not provided and not necessary, with the result that the weight, the number of parts and the installation space requirement of the bumper assembly 12 can be kept particularly low. Owing to the integration of the sensors into the reinforcement element 10, the installation space requirement can be kept particularly low.

Furthermore, the reinforcement element 10 can be adapted particularly easily and appropriately in terms of requirements to respective peripheral conditions in terms of the rigidity of said reinforcement element 10 and/or in terms of its volume, in particular in terms of the volume of the chamber 34. A further advantage is that the reinforcement element 10 has a significantly higher level of robustness than, for example, a pressure hose which is formed from silicone and has the purpose of sensing the collision, which pressure hose can be damaged significantly more easily than the reinforcement element 10, i.e. at significantly lower loads.

From FIG. 2 it is apparent that the reinforcement element 10 is secured on the longitudinal carriers independently of the bumper cover 14. This means that, for example, the bumper cover can be removed, that is to say released from the passenger car, without as a result the securement of the reinforcement element 10 to the longitudinal carriers being adversely affected, and vice versa. The reinforcement element 10 is not attached to the bumper cover 14 here.

The reinforcement element is embodied in an inherently rigid, that is to say dimensionally stable, fashion. The reinforcement element 10 is formed here from a material, plastic, which is different from a foam. In addition, it is apparent in FIG. 2 that the reinforcement element 10 is spaced apart completely toward the rear in the longitudinal direction of the vehicle from the bumper cover 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bumper assembly for a passenger car comprising:
a bumper cover configured to cover a cross-member;
at least one reinforcement element configured to reinforce the bumper cover underneath the cross-member; and
at least one sensor, which is coupled to the reinforcement element, configured to sense a deformation of the reinforcement element which results from a collision of the passenger car with a pedestrian,
wherein the reinforcement element has at least one chamber filled with a gas, which chamber is configured to be deformed as a result of the collision, and to which the at least one sensor is coupled such that a change in pressure in the chamber resulting from the deformation is sensed by the at least one sensor,
wherein reinforcement element is supported on a carrier element of the passenger car such that a load path from the carrier element to a lower leg of the pedestrian is provided in the event of the collision.

2. The bumper assembly as claimed in claim 1, wherein the at least one sensor is coupled to the chamber at a first end of the chamber, wherein at least a second sensor is coupled to the chamber at a second end of the chamber, spaced apart from the first end in a transverse direction of the vehicle, whereby the change in pressure in the chamber resulting from the deformation is sensed by the at least one sensor and the at least second sensor.

3. The bumper assembly as claimed in claim 1, wherein the reinforcement element extends over an at least major part of a width of the passenger car.

4. The bumper assembly as claimed in claim 2, wherein the reinforcement element extends over an at least major part of a width of the passenger car.

5. The bumper assembly as claimed in claim 1, wherein the reinforcement element is supported on at least one longitudinal carrier element of the passenger car.

6. The bumper assembly as claimed in claim 3, wherein the reinforcement element is supported on at least one longitudinal carrier element of the passenger car.

7. The bumper assembly as claimed in claim 5, wherein the cross-member is supported on the longitudinal carrier element.

8. The bumper assembly as claimed in claim 5, wherein the reinforcement element is secured to the longitudinal carrier element independently of the bumper cover.

9. The bumper assembly as claimed in claim 6, wherein the reinforcement element is secured to the longitudinal carrier element independently of the bumper cover.

10. The bumper assembly as claimed in claim 1, wherein the reinforcement element is more rigid than the flexible cross-member.

11. The bumper assembly as claimed in claim 1, wherein the reinforcement element is embodied as a component which is embodied separately from the bumper cover.

12. A passenger car having a bumper assembly, the bumper assembly comprising:
a bumper cover configured to cover a cross-member;
at least one reinforcement element configured to reinforce the bumper cover at least underneath the cross-member; and
at least one sensor, which is coupled to the reinforcement element, configured to sense a deformation of the reinforcement element which results from a collision of the passenger car with a pedestrian,
wherein the reinforcement element has at least one chamber filled with a gas, which chamber is configured to be deformed as a result of the collision, and to which the at least one sensor is coupled such that a change in pressure in the chamber resulting from the deformation is sensed by the at least one sensor,
wherein reinforcement element is supported on a carrier element of the passenger car such that a load path from the carrier element to a lower leg of the pedestrian is provided in the event of the collision.

13. The passenger car as claimed in claim 12, wherein the at least one sensor is coupled to the chamber at a first end of the chamber, wherein at least a second sensor is coupled to the chamber at a second end of the chamber, spaced apart from the first end in a transverse direction of the vehicle, whereby the change in pressure in the chamber resulting from the deformation is sensed by the at least one sensor and the at least second sensor.

14. The passenger car as claimed in claim 12, wherein the reinforcement element extends over an at least major part of a width of the passenger car.

15. The passenger car as claimed in claim 12, wherein the reinforcement element is supported on at least one longitudinal carrier element of the passenger car.

16. The passenger car as claimed in claim 15, wherein the cross-member is supported on the longitudinal carrier element.

* * * * *